March 31, 1964 O. HEINEMANN 3,127,250
HEAT EXCHANGER AND CHEMICAL REACTOR
Filed June 7, 1961 3 Sheets-Sheet 3
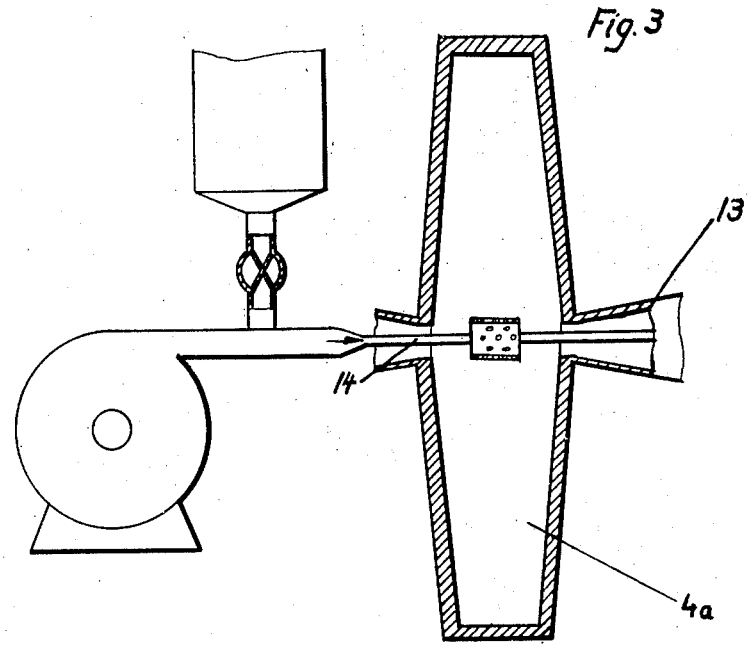
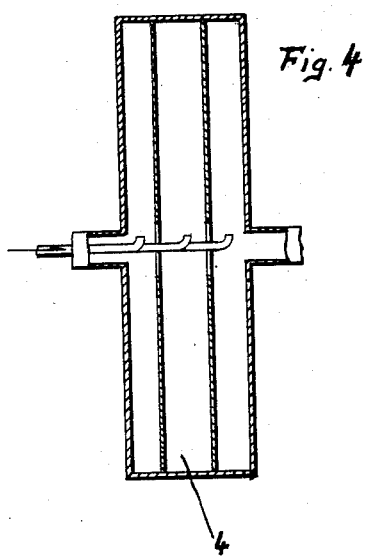

3,127,250
HEAT EXCHANGER AND CHEMICAL REACTOR
Otto Heinemann, Neubeckum, Westphalia, Germany, assignor to Polysius G.m.b.H., Neubeckum, Westphalia, Germany
Filed June 7, 1961, Ser. No. 115,419
Claims priority, application Germany June 8, 1960
1 Claim. (Cl. 34—57)

The present invention relates to an apparatus for exchanging heat, and also for carrying out chemical reactions or the like, in counter current flow between media of different state of aggregation, especially for pre-heating cement raw material by the waste gases of a succeeding finishing kiln, for instance a rotary kiln.

It is an object of the present invention to provide an apparatus of the above mentioned type, which will furnish the possibility of obtaining a counter flow while the two media will freely intermix and may have high velocities.

It is another object of this invention to provide an apparatus as set forth in the preceding paragraph, which will be relatively simple in construction and will be highly efficient.

These and other objects and advantages of the invention will appear more clearly from the following specification in connection with the accompanying drawings, in which:

FIG. 3 represents an axial section through a modified mixing chamber of the apparatus according to the invention.

FIG. 4 is a section through a multi-chambered arrangement according to the present invention.

Figure 1:
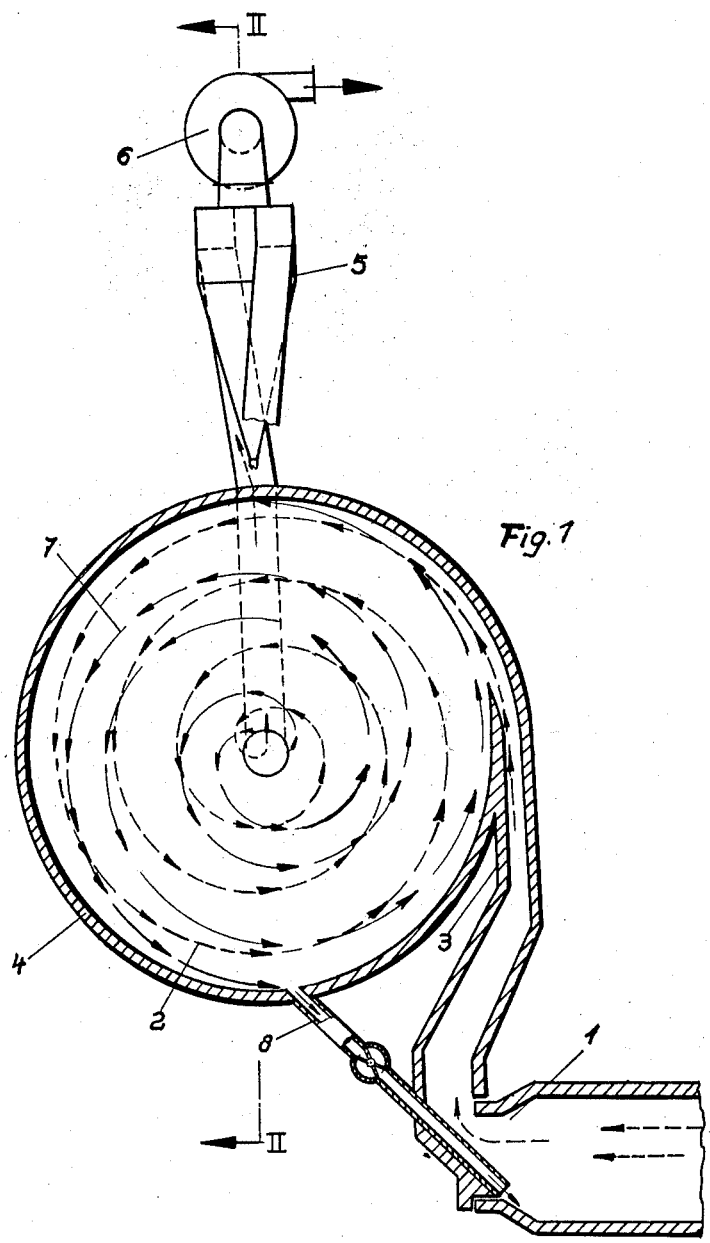
FIG. 1 illustrates a section through an apparatus according to the present invention, said section being taken perpendicularly to the axis of the apparatus.

The novel features of the apparatus according to the present invention consists in a cylindrical or nearly cylindrical chamber which may be subdivided by partitions extending perpendicularly to the axis of the cylindrical chamber. The said chamber is provided with one or more tangential inlet openings in the cylinder wall and with a central discharge opening for gaseous, vaporous or liquid media. The apparatus is furthermore provided with a substantially centrally located charging means for liquid, pasty or solid, especially granular or pulverous, material and also with collecting means for collecting the material at the periphery of the chamber.

The present invention for the first time furnishes the possibility of obtaining a counter current flow of two media freely intermixing with each other while said two media may have high velocities. To this end, a substantially cylindrical chamber is provided into which a medium flows tangentially and is discharged in the center of the chamber. During this movement, said medium moves along a spiral path while in the vicinity of the center of the chamber another specifically heavier medium is currently introduced by means known per se so that the first medium will impart upon the other medium a speed of rotation which carries the specifically heavier medium outwardly along the cylinder wall. The arrangement is such that the medium being discharged will not pull along the medium being charged.

In most instances, it is necessary to impart upon the medium being centrally introduced a certain starting speed in order to prevent said introduced medium from being immediately pulled out of the chamber by the medium being discharged. This initial speed may be brought about by means known per se, such as compressed air, centrifugal discs, or the like. However, instead, the medium to be introduced centrally may be introduced at the speed zero but in a sufficient distance from the central discharge station of the other medium. The medium, for instance fine granular material, will then be first carried along by the second medium, for instance gas, which at said point carries out a purely circulatory movement. However, at the same time the material will be subjected to the effect of the centrifugal force and will, therefore, follow a spiral-shaped path toward the outside, i.e. toward the walls of the heat exchanger.

The flow of the two media in the chamber, the axial width of which advantageously increases toward the central portion thereof, can particularly easily be controlled if this axial width is not selected too wide. If it is necessary for certain reasons to select the axial width larger, it will be advantageous to subdivide the chamber in its width by partitions. These partitions should be located perpendicularly with regard to the axis of the chamber.

Inasmuch as in most instances small quantities of the specifically heavier medium are carried away by the counter current flowing medium and are carried out of the chamber, it is advantageous to provide a separator, for instance a cyclon, as illustrated in the drawings from which separator or cyclon the separated material will then be returned into the chamber. Inasmuch as the thus carried away particles are predominantly the smallest or lightest particles, it is advantageous to introduce the returned quantities at a distance from the center of the chamber where less danger exists that they will be carried away again.

Figure 2:
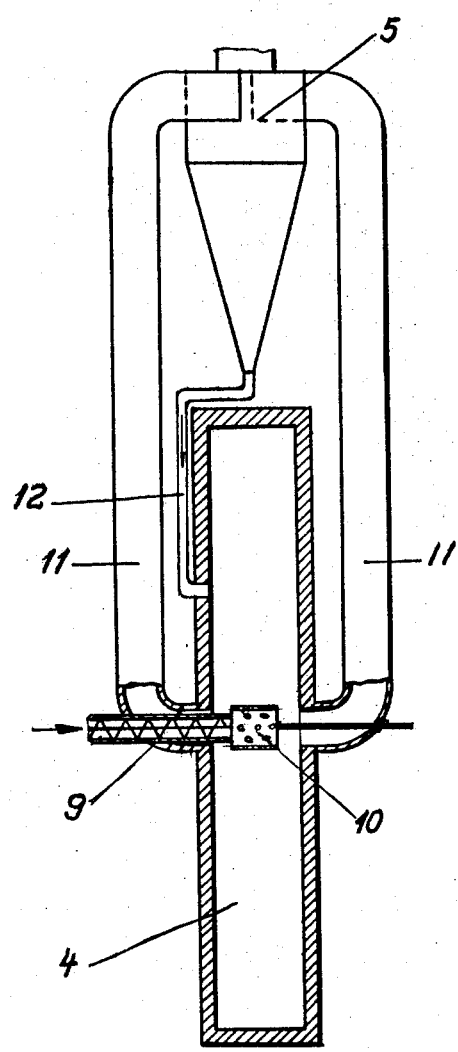
FIG. 2 is a section taken along the line II—II of FIG. 1 with certain parts in view.

Referring now to the drawings in detail and FIGS. 1 and 2 thereof in particular, these figures show a first embodiment of an apparatus according to the present invention. As will be seen from FIG. 1, waste gases 2 pass from a rotary kiln 1 through a tangential connection 3 as indicated by dashed arrows into a cylindrical chamber 4 in which they move along a spiral path to the center of the chamber 4. At said center the waste gases 2 leave the chamber 4 and are collected in a cyclone 5 from where they are blown by a blower 6 into the atmosphere. The specifically heavier material (see FIG. 2) is introduced in the central portion of chamber 4 and due to the spirally moving gas flow will be subjected to rotation. However, this specifically heavier material will due to its higher specific weight move along the spiral lines 7 along the arrows drawn in full lines and will move to the outer walls of the chamber on which it slides along in the direction of flow of the gases until it moves into the range of the discharge chute 8 through which the said specifically heavier material passes into the rotary kiln 1. If desired, the chute may be equipped with a rotary trap of any desired type in order to prevent the gases leaving the rotary kiln from passing through said chute into the chamber 4.

According to the arrangement shown in FIG. 2, the specifically heavier material is introduced into the central portion of chamber 4 by a feeder worm the end of which is provided with a kind of rotating, spraying, or immersing device 10 through which the said heavier material is centrifuged into chamber 4. The waste gases leave the chamber on both sides in axial direction through conduits 11 leading to the cyclon 5 from where the separated material is returned to chamber 4 through conduit 12 (indicated diagrammatically only by a line). In FIG. 2, the chamber width may be about 1.5 meters while the diameter is about 10 meters.

FIG. 3 shows a modified chamber 4a the dimensions of which increase toward the axis thereof in order to obtain a more favorable formation of the turbulence core. Moreover, chamber 4a is provided with conical discharge connections 13 for the waste gases. By discharging the waste gases to the atmosphere the pressure in the central portion of the chamber is reduced below atmospheric pressure to make possible a self-intake of the material through conveyor conduit 14.

In FIG. 3 a chamber of about 10 meters diameter would be about 2 meters wide in the center.

FIGURE 4 illustrates an advantageous embodiment of the invention in which, for reasons of an increased output, a plurality of chambers are arranged adjacent to each other and in parallel, while, advantageously, the width of the housing is a multiple of one chamber width and the housing is therefore subdivided by partitions into individual chambers.

While the apparatus according to the present invention is particularly suitable for pre-heating cement raw material by the waste gases of a rotary kiln, it may also be employed wherever a heat exchanger or a chemical reaction or the like is desired between two media of different state or aggregation or of at least noticeable different specific weights, for instance non-intermixable liquids, while the media freely flow in counter current to each other.

It is of course, to be understood that the present invention is by no means, limited to the particular constructions shown in the drawings but also comprises any modifications within the scope of the appended claim.

What I claim is:

An apparatus for use as heat exchanger and also as chemical reactor, which comprises a housing having a substantially cylindrical chamber arranged with its axis horizontal and of an axial dimension or width amounting to a fraction of the diameter of said chamber, said housing being provided with tangential inlet means extending substantially over the width of said chamber and tangentially leading into said chamber for introducing a gaseous treating medium thereinto, said housing also being provided with additional inlet means arranged in the central portion of said housing to introduce a solid particulate medium to be treated into the central portion of said chamber, said additional inlet means including rotatable conveying means, outlet means arranged in the central portion of at least one of the end walls of said housing for withdrawing the treating medium from the central portion of said chamber, and discharge passage means arranged near the periphery of said chamber for discharging the treated medium.

References Cited in the file of this patent
UNITED STATES PATENTS

| | | |
|---|---|---|
| 2,692,864 | Gerhold | Oct. 26, 1954 |
| 2,802,280 | Sylvest | Aug. 13, 1957 |
| 2,819,890 | Rosa | Jan. 14, 1958 |
| 2,847,083 | Hibshman | Aug. 12, 1958 |

FOREIGN PATENTS

| | | |
|---|---|---|
| 63,080 | Denmark | Dec. 18, 1944 |